(12) United States Patent
Farrar et al.

(10) Patent No.: US 11,250,346 B2
(45) Date of Patent: Feb. 15, 2022

(54) REJECTING BIASED DATA USING A MACHINE LEARNING MODEL

(71) Applicant: Google LLC, Mountain View, CA (US)

(72) Inventors: Christopher Farrar, Wexford, PA (US); Steven Ross, Allison Park, PA (US)

(73) Assignee: Google LLC, Mountain View, CA (US)

( * ) Notice: Subject to any disclaimer, the term of this patent is extended or adjusted under 35 U.S.C. 154(b) by 829 days.

(21) Appl. No.: 16/126,860

(22) Filed: Sep. 10, 2018

(65) Prior Publication Data

US 2020/0082300 A1    Mar. 12, 2020

(51) Int. Cl.
*G06N 20/00* (2019.01)
*G06N 5/04* (2006.01)

(52) U.S. Cl.
CPC ............... *G06N 20/00* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 7,437,334 | B2 | 10/2008 | Forman et al. |
| 9,852,019 | B2 | 12/2017 | Ashani |
| 2011/0289025 | A1 | 11/2011 | Yan et al. |

FOREIGN PATENT DOCUMENTS

JP    2017076289 A    4/2017

OTHER PUBLICATIONS

Morris, et al., Model-Driven Computational Sprinting, EuroSys '18, 2018, pp. 1-13 (Year: 2015).*
Guo, et al., Embedding Undersampling Rotation Forest for Imbalanced Problem, Computational Intelligence and Neuroscience, vol. 2018, Article ID 6798042, 2018, pp. 1-15 (Year: 2018).*
Identifying Mislabeled Training Data, Carla Brodley, pp. 131-167, Aug. 1999.

* cited by examiner

*Primary Examiner* — Wilbert L Starks
(74) *Attorney, Agent, or Firm* — Hontgman LLP; Brett A. Krueger

(57) ABSTRACT

A method for rejecting biased data using a machine learning model includes receiving a cluster training data set including a known unbiased population of data and training a clustering model to segment the received cluster training data set into clusters based on data characteristics of the known unbiased population of data. Each cluster of the cluster training data set includes a cluster weight. The method also includes receiving a training data set for a machine learning model and generating training data set weights corresponding to the training data set for the machine learning model based on the clustering model. The method also includes adjusting each training data set weight of the training data set weights to match a respective cluster weight and providing the adjusted training data set to the machine learning model as an unbiased training data set.

20 Claims, 10 Drawing Sheets

REJECTING BIASED DATA USING A MACHINE LEARNING MODEL

TECHNICAL FIELD

This disclosure relates to rejecting biased data using a machine learning model.

BACKGROUND

Generally speaking, bias is the tendency of a statistic to overestimate or underestimate a parameter. In this respect, collecting data and analyzing data typically includes some inherent biases. These biases may result from the method of collection and analysis or the entity that performs the collection and the analysis. For example, a data study designed and performed by a human may cater to a particular hypothesis, human design constraints (e.g., human capabilities), sampling constraints, and the like. By catering to these elements, data results of the study likely include a variety of sampling errors, measurement errors, or errors more broadly based on a sample unrepresentative of a target population for the study. As computer processing enables technology to collect and to analyze data at rates unparalleled to human activity, data processing techniques must equally overcome issues with bias. Otherwise, data processing, especially for bulk data, may amplify bias issues and produce results also unparalleled to biases produced by human activity.

SUMMARY

One aspect of the disclosure provides a method for rejecting biased data using a machine learning model. The method includes receiving, at data processing hardware, a cluster training data set, the cluster training data set including a known unbiased population of data. The method also includes training, by the data processing hardware, a clustering model to segment the received cluster training data set into clusters based on data characteristics of the known unbiased population of data. Each cluster of the cluster training data set includes a cluster weight. The method further includes receiving, at the data processing hardware, a training data set for a machine learning model and generating, by the data processing hardware, training data set weights corresponding to the training data set for the machine learning model based on the clustering model. The method also includes adjusting, by the data processing hardware, each training data set weight of the training data set weights to match a respective cluster weight and providing, by the data processing hardware, the adjusted training data set to the machine learning model as an unbiased training data set.

Implementations of the disclosure may include one or more of the following optional features. In some implementations, the method includes providing the adjusted training data set to the machine learning model as the unbiased training data set further includes training the machine learning model with the unbiased training data set. The method may include training, by the data processing hardware, the machine learning model with the unbiased training data set or may include receiving, at the data processing hardware, a sample data set including at least one respective data characteristic. Here, the method may also include generating, by the data processing hardware, an unbiased prediction value based on the received sample data set using the trained machine learning model.

In some examples, adjusting each training data set weight to match the respective cluster weight includes, for each training data set weight, matching the training data set weight to the respective cluster weight based on a common data characteristic and removing data from the training data set until the training data set weight matches the respective cluster weight. In other examples, adjusting each training data set weight to match the respective cluster weight includes, for each training data set weight, matching the training data set weight to the cluster weight based on a common data characteristic and duplicating data from the training data set until each training data set weight matches the respective cluster weight.

In some configurations, for each training data set weight, adjusting each training data set weight to match the respective cluster weight includes matching the training data set weight to the cluster weight based on a common data characteristic. When the training data set weight is less than the respective cluster weight, the method may include associating an importance weight indicating to increase training of the machine learning model with respect to training data corresponding to the training data set weight. Additionally or alternatively, for each training data set weight, adjusting each training data set weight to match the respective cluster weight may include matching the training data set weight to the cluster weight based on a common data characteristic. Here, when the training data set weight is greater than the respective cluster weight, the method may include associating an importance weight indicating to decrease training of the machine learning model with respect to training data corresponding to the training data set weight.

In some implementations, adjusting each training data set weight of the training data set weights to match the respective cluster weight includes, for each training data set weight, matching the training data set weight to the respective cluster weight based on a common data characteristic. When the training data set weight is less than the respective cluster weight, the method includes associating an importance weight indicating to increase training of the machine learning model with respect to training data corresponding to the training data set weight and when the training data set weight is greater than the respective cluster weight, the method includes associating an importance weight indicating to decrease training of the machine learning model with respect to training data corresponding to the training data set weight.

In some examples, when training the clustering model the method includes segmenting the received cluster training data set into clusters based on data characteristics of the known unbiased population of data. In this example, for each cluster of the clusters based on the data characteristics of the known unbiased population of data, the method includes determining the cluster weight by for each cluster of the cluster model based on a ratio of a size of a respective cluster to a size of the known unbiased population of data. In some implementations, an unsupervised machine learning algorithm segments the received cluster training data set into clusters based on the data characteristics of the known unbiased population of data.

Another aspect of the disclosure provides a system for rejecting biased data using a machine learning model. The system includes data processing hardware and memory hardware in communication with the data processing hardware. The memory hardware stores instructions that when executed on the data processing hardware cause the data processing hardware to perform operations. The operations include receiving a cluster training data set, the cluster training data set including a known unbiased population of data. The operations also include training a clustering model to segment the received cluster training data set into clusters based on data characteristics of the known unbiased population of data, each cluster of the cluster training data set including a cluster weight. The operations further include receiving a training data set for a machine learning model and generating training data set weights corresponding to the training data set for the machine learning model based on the clustering model. The operations also include adjusting each training data set weight of the training data set weights to match a respective cluster weight and providing the adjusted training data set to the machine learning model as an unbiased training data set.

This aspect may include one or more of the following optional features. In some configurations, the operation of providing the adjusted training data set to the machine learning model as the unbiased training data set includes training the machine learning model with the unbiased training data set. The operations may also include training the machine learning model with the unbiased training data set, receiving a sample data set comprising at least one respective data characteristic, and generating an unbiased prediction value based on the received sample data set using the machine learning model.

In some implementations, the operation of adjusting each training data set weight of to match the respective cluster weight further includes, for each training data set weight, matching the training data set weight to the respective cluster weight based on a common data characteristic and removing data from the training data set until the training data set weight matches the respective cluster weight. In other examples, the operation of adjusting each training data set weight to match the respective cluster weight includes, for each training data set weight, matching the training data set weight to the cluster weight based on a common data characteristic and duplicating data from the training data set until each training data set weight matches the respective cluster weight In some examples, the operation of adjusting each training data set to match the respective cluster weight includes, for each training data set weight, matching the training data set weight to the cluster weight based on a common data characteristic. In this example, when the respective training data set weight is less than the respective cluster weight, the operations include associating an importance weight indicating to increase training of the machine learning model with respect to training data corresponding to the training data set weight. In other examples, the operation of adjusting each training data set weight to match the respective cluster weight may include matching the training data set weight to the cluster weight based on a common data characteristic. In this example, when the respective training data set weight is greater than the corresponding cluster weight, the operations include associating an importance weight indicating to decrease training of the machine learning model with respect to training data corresponding to the training data set weight.

Additionally or alternatively, the operation of adjusting each training data set weight to match the respective cluster weight may include, for each training data set weight, matching the training data set weight to the respective cluster weight based on a common data characteristic. Here, when the respective training data set weight is less than the respective cluster weight, associating an importance weight indicating to increase training of the machine learning model with respect to training data corresponding to the training data set weight and when the training data set weight is greater than the respective cluster weight, associating an importance weight indicating to decrease training of the machine learning model with respect to training data corresponding to the training data set weight.

In some configurations, the operation of training the clustering model may include segmenting the received cluster training data set into clusters based on data characteristics of the known unbiased population of data and for each cluster of the clusters based on the data characteristics of the known unbiased population of data, determining the cluster weight by for each cluster of the cluster model based on a ratio of a size of a respective cluster to a size of the known unbiased population of data. In some examples, an unsupervised machine learning algorithm segments the received cluster training data set into clusters based on the data characteristics of the known unbiased population of data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
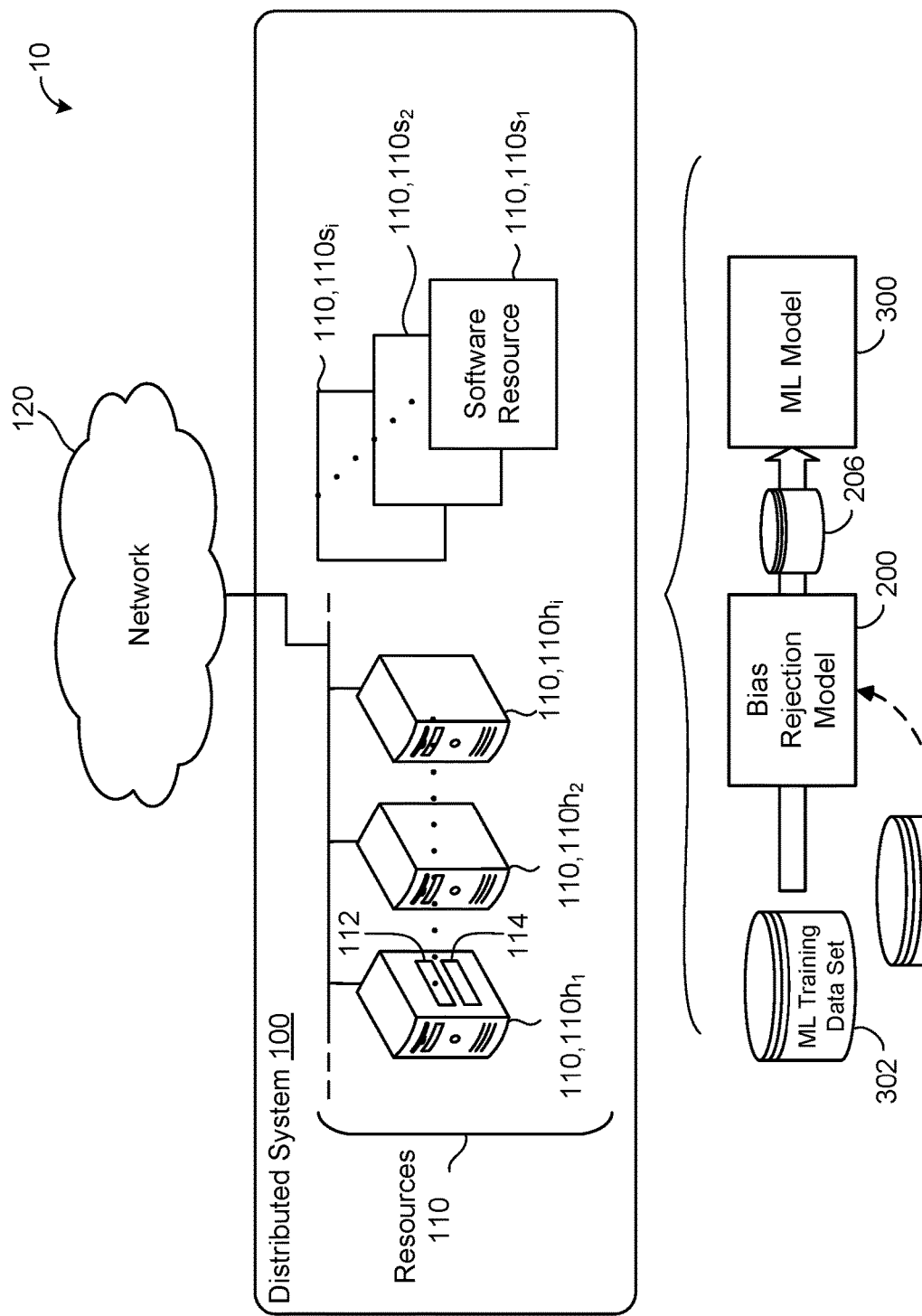
FIG. 1 is a schematic view of an example machine learning environment.

FIG. 1 is an example of a machine learning environment 10. The machine learning environment 10 generally includes a distributed system 100 (e.g., a remote system such as a cloud environment) with resources 110 accessible via a network 120, a bias rejection model 200 and a machine learning model 300. The resources 110 are accessible to the bias rejection model 200 and/or the machine learning model 300 for use in training the bias rejection model 200 and/or the machine learning model 300, as well as for performing machine learning functions disclosed herein. The distributed system 100 may be any computer processing system with computing resources (e.g., resources 110) capable of executing the bias rejection model 200 and/or the machine learning model 300. In some examples, the bias rejection model 200 and/or the machine learning model 300 execute on a device accessible to, or otherwise in communication with, the distributed system 100 via the network 120. For instance, the device may execute a web-based application associated with the distributed system 100.

Generally, resources 110 of the distributed system 100 may include hardware resources 110h, $110h_{1-i}$ and software resources 110s, $110s_{1-i}$. The hardware resources 110h include data processing hardware 112 and memory hardware 114. The software resources 110s may include software applications, software services, application programming interfaces (APIs) or the like. The software resources 110s may reside on the hardware resources 110h (e.g., stored in the memory hardware 114) or may include instructions executed on the data processing hardware 112.

A software application (i.e., a software resource 110s) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The memory hardware 114 is non-transitory memory that may be physical devices used to store programs (e.g., sequences of instructions) or data (e.g., program state information) on a temporary or permanent basis for use by data processing hardware 112. The memory hardware 114 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), and phase change memory (PCM).

In the example shown, the bias rejection model 200 executes in conjunction with the resources 110 to address bias issues from detrimentally influencing the machine learning model 300. In other words, the bias rejection model 200 is configured to prevent training the machine learning model 300 on a machine learning (ML) training data set 302 that includes biased data by generating/outputting an unbiased training data set 206 that is associated with the ML training data set 302, but with the biased data removed, for use in training the ML model 300. By preventing the machine learning model 300 from training on biased data within the ML training data set 302, the machine learning model 300 is not influenced by the biased data and is therefore capable of generating an unbiased prediction value 310 (FIG. 3) during inference. Thus, the bias rejection model 200 corresponds to a filter that removes/adjusts biased data within the ML training data set 302 prior to training the ML model 300 by outputting/generating the unbiased training data set 206 for use in training the ML model 300.

Figure 2A:
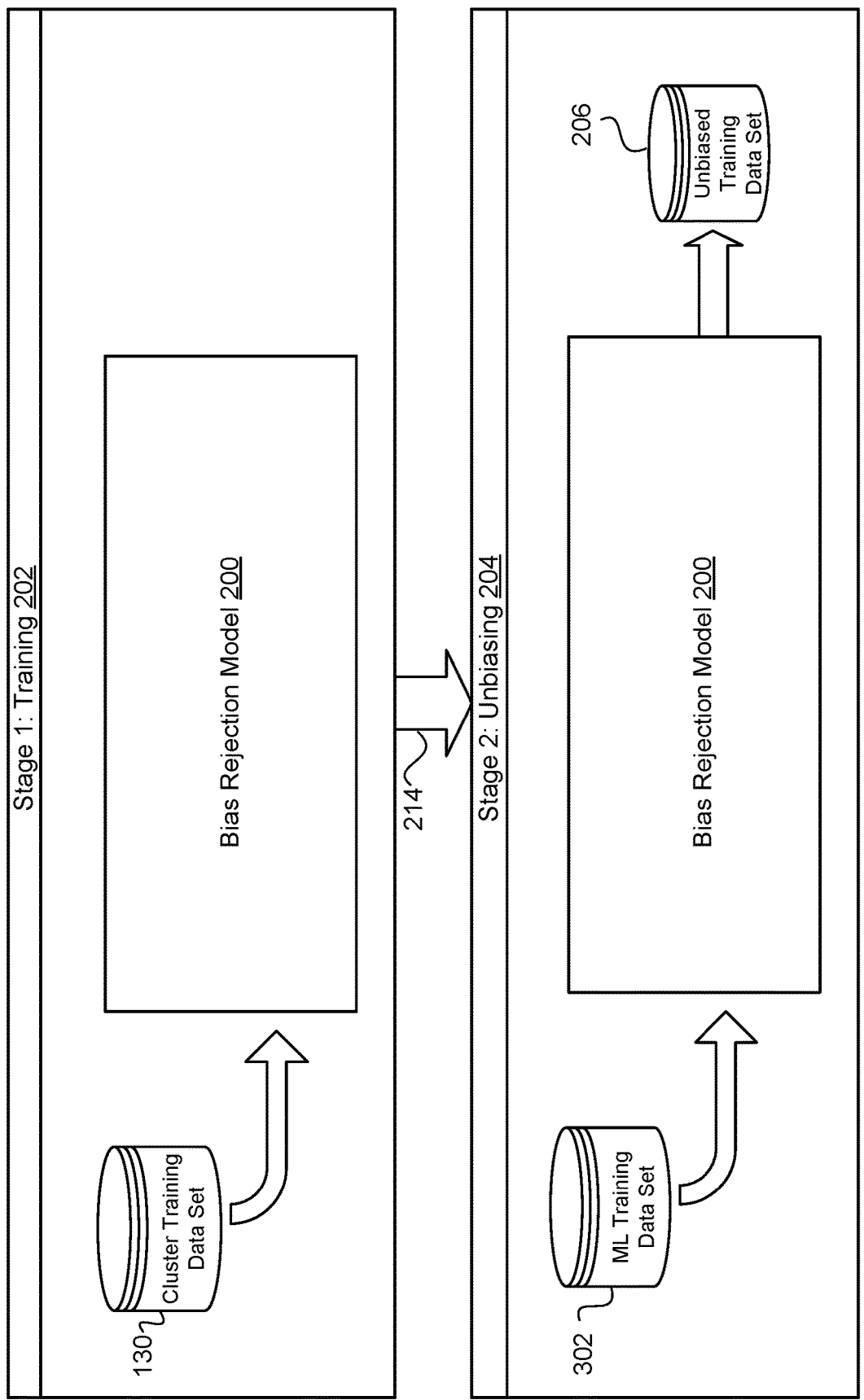
FIG. 2A is a schematic view of example processing stages for a bias rejection model.

FIG. 2A shows the bias rejection model 200 during execution of a first training stage 202 and a second unbiasing stage 204 subsequent to the first training stage 202. During the training stage 202, the bias rejection model 200 receives a cluster training data set 130 and outputs cluster weights 214. During the unbiasing stage 204, the biasing rejection model 200 receives the ML training data set 302 and uses the cluster weights 214 output from the training stage 202 to output the unbiased training data set 206 having biased data removed from the ML training data set 302.

Here the term "weight(s)" (e.g., bias cluster weights 214, 214a-n and training data set weights 218, 218a-n) refers to values, such as ratios, that map to unique clusters formed from a process of clustering. For populations, each cluster may pertain to a fraction of a population and thus the value of the fraction may be a weight associated with the cluster (e.g., subset of the population). In other words, by clustering a population into subsets, each subset inherently has characteristics (e.g., a weight) with respect to the population. More generally, a cluster, such as a bias cluster 212 or a training cluster 216, refers to a grouping of people that can be used to group training data pertaining to those people. The grouping of people may contain people that share a continuous range of variable values in their training data (e.g., a cluster for Asian women age 25-27 could contain one training example with a 25 year old Asian woman, another with a 26 year old Asian woman, and others sharing this set of values).

In other implementations, a cluster contains people whose training data is clustered by a clustering algorithm (e.g., a clustering model). The clustering algorithm puts people in groups that the algorithm thinks are similar based on having shorter distances between people (or characteristics of the people). Grouping by shorter distances may avoid having an exponential growth of the number of clusters as a number of variable values grows in a respective population. Clustering may be performed according to variables of concern (e.g., bias variables) and/or other variables to determine the distance between training data (e.g., people). For instance, clustering is performed based on other variables, but a final determination for clustering a datum is based on variable(s) of concern (e.g., bias variables). As an example, the clustering process groups 18-year old and 19-year-old male Austrians and Germans together into a single cluster because it recognizes similarity (e.g., shorter distances between each other) based on defined metrics (e.g., languages used, relevant interests, frequency of being connected in social networks or being members of the same organizations). As another example to illustrate a vast array of potential clustering approaches, the clustering process may have four separate groups covering these categories: (1) 18 year old Austrians; (2) 18 year old Germans; (3) 19 year old Austrians; and (4) 19 year old Germans.

With further reference to FIG. 2A, during the training stage 202, the bias rejection model 200 receives the cluster training data set 130 corresponding to a known unbiased population of data. The known unbiased population of data may be a target population with an accurate probability distribution of bias sensitive variables. With a known unbiased population of data, the bias rejection model 200 avoids training with data having a disproportionate amount of data relating to bias sensitive variables. Bias sensitive variables refer to variables that, when overrepresented or underrepresented in a data sample of a target population, result in an increased likelihood of biased predictions from sampling of the target population. In other words, slight deviations from accurate representations of bias sensitive variables likely result in skewed predictive analysis. Consequently, when machine learning models, such as machine learning model 300, are constructed (i.e. trained) without an accurate training data set of bias sensitive variables, machine learning models may inherently produce biased predictions and biased computing analytics. Some examples of bias sensitive variables include race, gender, sex, age, nationality, religious affiliation, political affiliation, affluence, etc.

In some examples, the target population is a full dataset for a given variable or set of variables. Here, the bias rejection model 200 and/or machine learning model 300 may be trained and/or make predictions corresponding to the target population (e.g., a population corresponding to the cluster training data set 130). As a basic example, the machine learning model 300 may be configured to predict values for a target population that is a population of California. In order to accurately make predictions about the population of California, each model 200, 300 trains on data associated with the population of California.

After training the bias rejection model 200 on the received cluster training data set 130, the bias rejection model 200 is configured to, during the unbiasing stage 204, adjust the ML training data set 302 intended for use in training the ML model 300. By adjusting the ML training data set 302 prior to training the ML model 300, the bias rejection model 200 generates the unbiased training data set 206 and provides the unbiased training data set 206 to the ML model 300. In other words, during the unbiasing stage 204, the bias rejection model 200 converts the ML training data set 302 (e.g., that may potentially include biased data) into the unbiased training data set 206 based on the training of the biased rejection model 200 on the cluster training data set 130 during the training stage 202. In some examples, the bias rejection model 200 trains with more than one cluster training data set 130. For example, the bias rejection model 200 dynamically trains on new or updated cluster training data sets 130 to continuously account for changes to the cluster training data sets 130 over time. The training stage 202 and the unbiasing stage 204 may execute consecutively or simultaneously, or some combination of both.

Figure 2B:
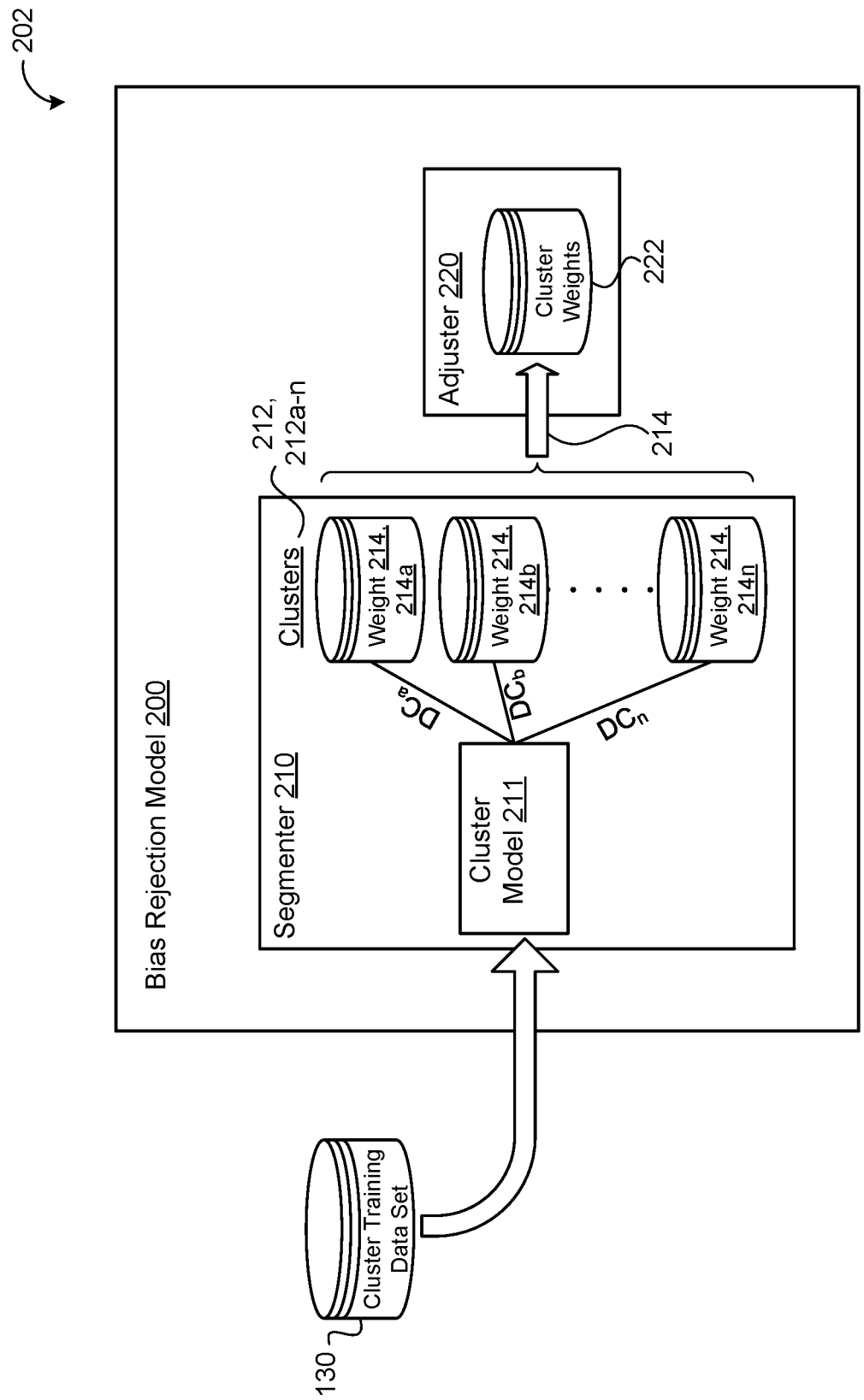
FIG. 2B is a schematic view of an example bias rejection model during the training stage of FIG. 2A.

FIG. 2B illustrates an example of the bias rejection model 200 during the training stage 202. Here, the bias rejection model 200 receives the cluster training data set 130 including the known unbiased population of data. Although in some implementations, an entity, such as an administrator of the bias rejection model 200 or a user with access to the bias rejection model 200 (e.g., a user concerned about a particular set of bias features), may define bias features corresponding to bias sensitive variables. Here, the entity or designer of the bias rejection model 200 does not supply bias features and/or bias sensitive variables to the bias rejection model 200. Rather, the bias rejection model 200 via the segmenter 210 uses a cluster model 211 to model the cluster training data set 130 in order to recognize biased or unbiased data. In some configurations, the cluster training data set 130 includes the full target population dataset. For example, the bias rejection model 200 may receive a complete data set of demographic data for the United States as the cluster training data set 130.

The bias rejection model 200 includes a segmenter 210 and an adjuster 220. The segmenter 210 is configured to segment a data set into clusters 212, 212$a$-$n$ using the cluster model 211. During the training stage 202, the segmenter 210 trains the clustering model 211 to segment the received cluster training data set 130 into clusters 212, 212$a$-$n$ based on data characteristics (shown as "$DC_{a-n}$" in FIG. 2B) of the known unbiased population of data. For simplicity these data characteristics include at least one respective bias sensitive variable of the target population related to the cluster training data set 130. In other words, some clusters 212 may be bias clusters associated with at least one respective bias sensitive variable as the data characteristic while other clusters 212 identify data characteristics not related to bias sensitive variable(s). In some implementations, the cluster model 211 includes a clustering algorithm such that the cluster model 211 performs unsupervised learning based on the received cluster training data set 130 during the training stage 202. Unsupervised learning refers to a process where the learning occurs using data that does not include any labels associated with the data (e.g., pre-labeled bias sensitive variables). By performing unsupervised learning based on the received cluster training data set 130, the cluster model 211 becomes trained to identify a probability distribution for an unbiased data set (via the known unbiased population of data) in terms of data characteristics. For example, the cluster model 211 is trained to generate at least one cluster 212 with data characteristic(s) representative of bias sensitive variables and/or a combination of bias sensitive variables.

As an example, the cluster model 211 clusters each of the bias sensitive variables of race, gender, and age as data characteristics of the known unbiased population. Here, each cluster 212 may therefore correspond to a corresponding bias sensitive variable combination. As an example, with data characteristics of race, gender, and age, at least one cluster 212 corresponds to one type of race (e.g., black, white, hispanic, etc), one type of gender (e.g., male, female, transgender), and one type of age bracket (e.g., 19-30, 31-44, 45-59, 60+, etc.). When the segmenter 210 segments the cluster training data set 130 into clusters 212 using the cluster model 211, the segmenter 210 is also configured to determine a corresponding cluster weight 214 for each cluster 212, such that the clusters 212, 212$a$-$n$ have associated cluster weights 214, 214$a$-$n$. In some examples, the cluster weight 214 represents a population fraction for a cluster 212 with respect to the target population (e.g., the population of the cluster training data set 130). For example, the cluster weight 214 may represent a ratio of a size of a respective cluster 212 to a size of the target population of the cluster training data set 130. In some examples, to determine each cluster weight 214, the segmenter 210 determines the population fractions of each cluster 212 and divides each population fraction by the greatest population fraction of all clusters 212 (e.g., each cluster weight 214 is less than 1). In other examples, to determine each cluster weight 214, the segmenter 210 determines the population fractions of each cluster 212 and divides each population fraction by the lowest population fraction of all clusters 212 (e.g., each cluster weight 214 is greater than 1).

In some configurations, the segmenter 210 communicates the cluster weights 214 for the clusters 212 to the adjuster 220 during the training stage 202. For example, the adjuster 220 includes a datastore 222 of cluster weights 214. In other examples, the segmenter 210 stores the cluster weights 214 (e.g., in a datastore of the segmenter 210) for the adjuster 220 to access during the unbiasing stage 204.

Figure 2C:
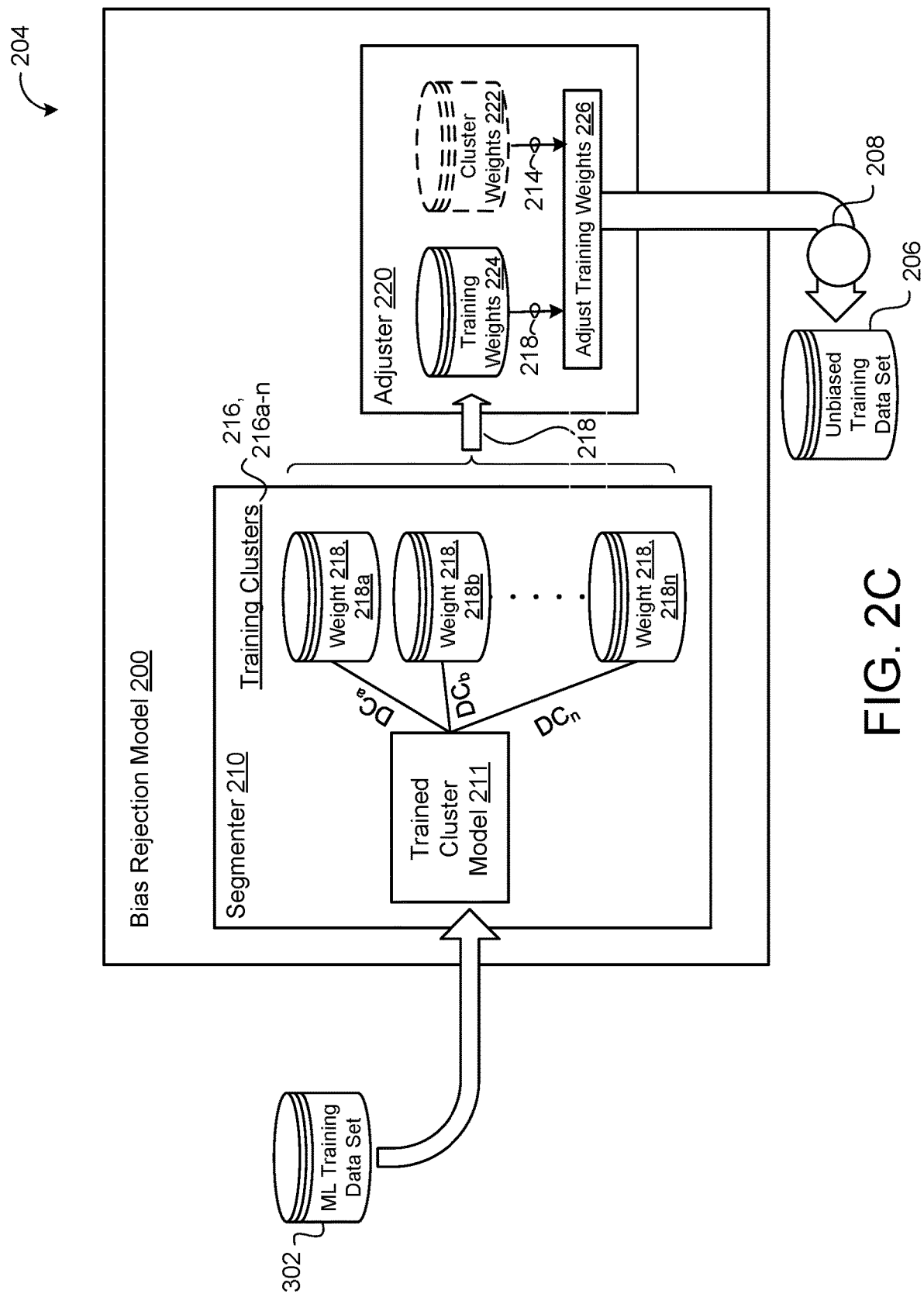
FIG. 2C is a schematic view of an example bias rejection model during the unbiasing stage of FIG. 2A.

FIG. 2C illustrates an example of the bias rejection model 200 during the unbiasing stage 204. During the unbiasing stage 204, the bias rejection model 200 receives the ML training data set 302 intended for use in training the ML model 300. For example, the training data set 302 may include a raw training data set that may be potentially biased (e.g., include biased data). In some implementations, the training data set 302 is a sample of the target population and, as such, may inaccurately reflect bias sensitive variables 132 of the target population. For instance, the target population may have a racial makeup of 25% white, while the training data set 302 may indicate a sampling racial makeup of 45% white. Thus, in order to prevent training the ML model 300 on ML training data 302 that inaccurately reflects bias sensitive variables of the target population, the bias rejection model 200 seeks to adjust this bias (e.g., 20% difference) with the segmenter 210 and the adjuster 220 during the unbiasing stage 204.

Similar to how the segmenter 210 segments the bias training data set 130 into the bias clusters 212 during the training stage 202 of FIG. 2B, the segmenter 210 is configured to segment the received ML training data set 302 into training clusters 216 during the unbiasing stage 204. The segmenter 210 segments the training data set 302 by providing the training data set 302 to the trained cluster model 211. Based on the training from the training stage 202, the cluster model 211 has learned how to segment a data set, such as the training data set 302 into clusters (e.g., clusters 212a-n or training clusters 216a-n). During the unbiasing stage 204, the cluster model 211 generates training clusters 216, 216a-n based on received training data set(s) 302 intended for the machine learning model 300. Here, at least one training cluster 216 is associated with at least one corresponding bias sensitive variable of the target population. The segmenter 210 is further configured to generate a corresponding training data set weight 218, 218a-n for each segmented training cluster 216, such that the segmented training clusters 216 include associated training data set weights 218. In some examples, a respective training data set weight 218 represents a population fraction for a training cluster 216 with respect to the sample population associated with the training data set 302. For example, the training data set weight 218 may represent a ratio of a size of a respective training cluster 216 to a size of the sample population of the training data set 302. In some examples, to determine each training data set weight 218, the segmenter 210 determines the population fractions of each training cluster 216 and divides each population fraction by the greatest population fraction of the training clusters 216 (e.g., each training data set weight 218 is less than 1). In other examples, to determine each training data set weight 218, the segmenter 210 determines the population fractions of each training cluster 216 and divides each population fraction by the lowest population fraction of the training clusters 216a-n (e.g., each training data set weight 218 is greater than 1).

Figure 2D:
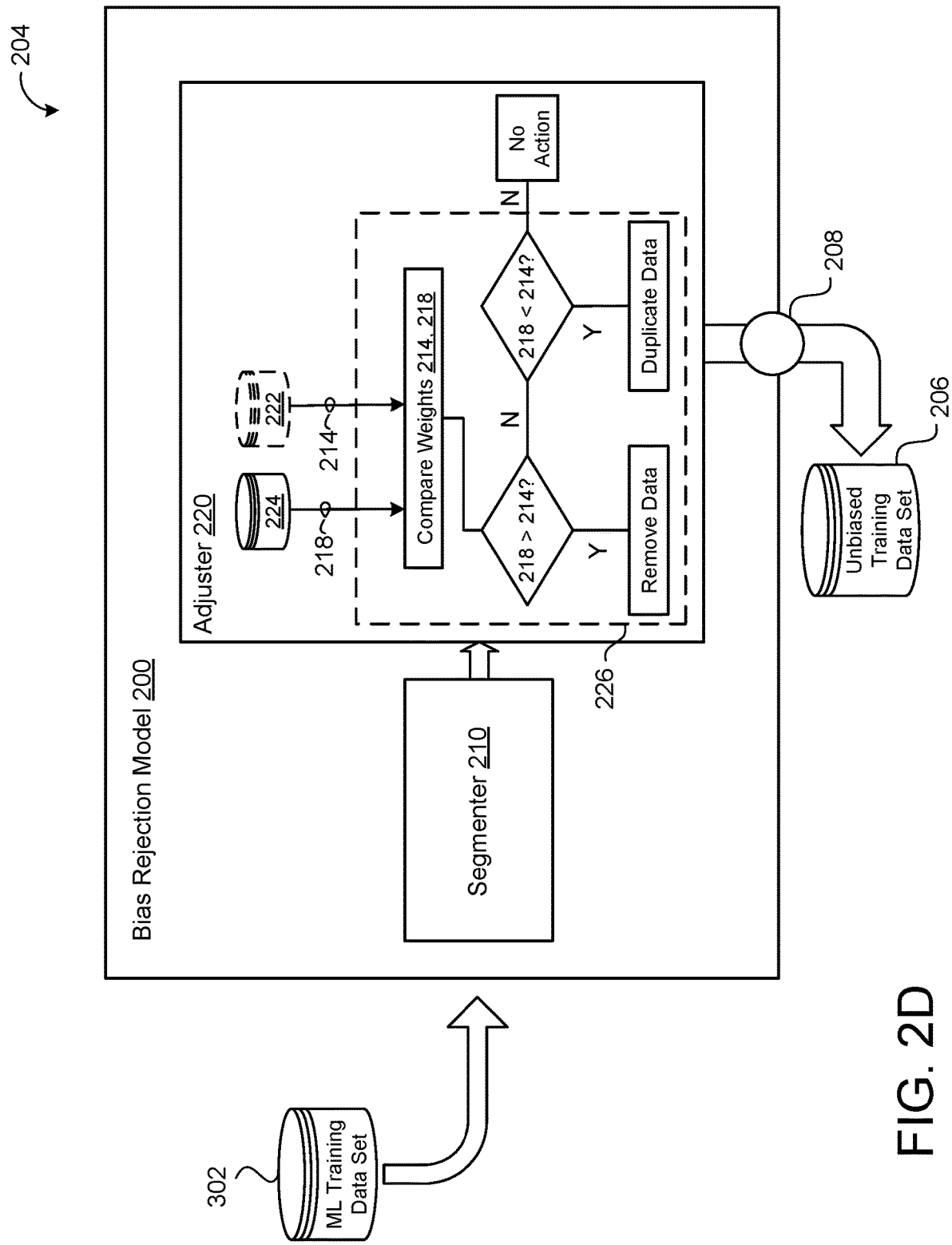
FIGS. 2D and 2E are schematic views of example adjustments made by a bias rejection model during the unbiasing stage of FIG. 2A.
Figure 2E:
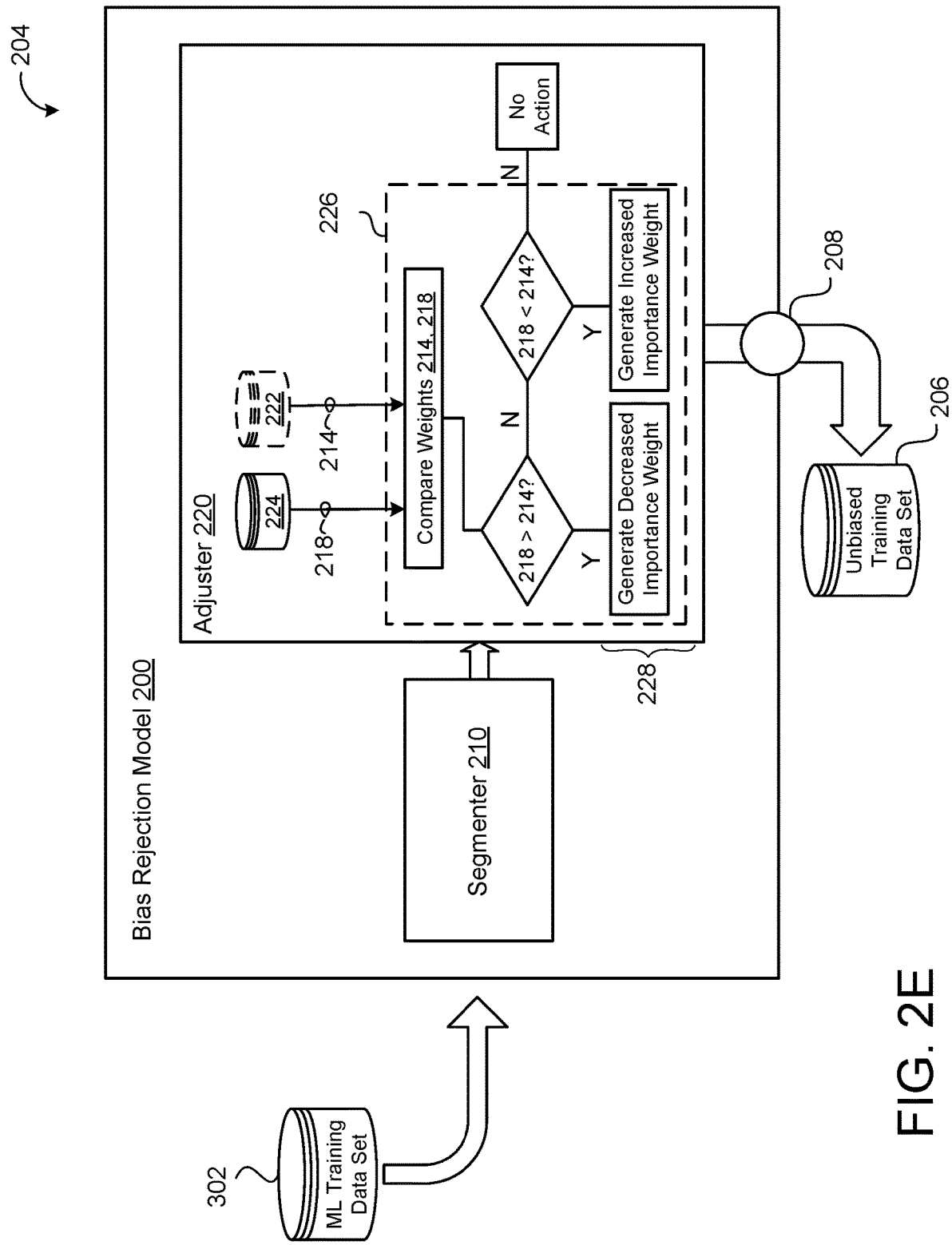

The adjuster 220 is configured to adjust the training data set weights 218 in order to match the probability distribution of data characteristics (i.e. the bias sensitive variables) of the target population. In some implementations, the adjuster 220 executes a process 226 that adjusts the training data set weights 218 by comparing the training data set weights 218 to the cluster weights 214. For example, FIGS. 2C-2E depict the adjuster 220 executing the process 226 to retrieve and compare the cluster weights 218 from the cluster weight datastore 222 and the training data set weights 218 from a training weights datastore 224, and adjust the training data set weights 218 based on the comparison. For instance, based on a comparative difference between a respective training data set weight 218 and a cluster weight 214, the adjuster 220 may adjust the respective training data set weight 218 to match the corresponding cluster weight 214. Accordingly, the process 226 executed by the adjuster 220 for adjusting the training data set weights 218 generates/outputs the adjusted training data set weights or more generally an adjusted training data set 208 that form the unbiased training data set 206 for training the ML model 300.

In some implementations, the adjuster 220 executes the process 226 by first matching one or more training data set weights 218a-n to one or more cluster weights 214a-n based on a matching data characteristic, such as a bias sensitive variable. For instance, when a training data set weight 218 and a cluster weight 214 each share a common data characteristic (e.g., a bias sensitive variable) or a combination of data characteristics, the adjuster 220 may adjust the training data set weight 218 with the matching (i.e., corresponding) cluster weight 214 to output a corresponding adjusted training data set weight and/or an adjusted training data set 208.

Referring to FIG. 2D, the adjuster 220 compares a training data set weight 218 and a bias cluster weight 214 that share a common data characteristic (e.g., a bias sensitive variable) or a combination of data characteristics. When the ML training data set 302 over represents a bias sensitive variable, the training data set weight 218 exceeds (e.g., is greater than) the cluster weight 214 (e.g., the training data set 302 indicates a 20% greater white racial makeup) for the data characteristic corresponding to the bias sensitive variable. In response to this over representation, the process 226 executing by the adjuster 220 may correspond to a data removal adjustment process that adjusts the training data set weight 218 by removing data from the training data set 302 until the training data set weight 218 matches the cluster weight 214. On the other hand, when the training data set 302 under represents the bias sensitive variable, the training data set weight 218 is less than the cluster weight 214 (e.g., the training data set 302 indicates a 20% lessor black racial makeup) for the data characteristic corresponding to the bias sensitive variable. In response to this under representation, the process 226 executing on the adjuster 220 may correspond to a data duplication process that adjusts the training data set weight 218 by duplicating data from the training data set 302 until the training data set weight 218 matches the cluster weight 214. In some implementations, the adjuster 220 randomly duplicates or removes data from the training data set 302 to maintain integrity of the training data set 302. This may avoid further biases associated with non-random selective duplication or removal.

By contrast to the process 226 of FIG. 2C that either removes/adds data to/from the training data set 302 until the training data set weight 218 matches the bias cluster weight 214, FIG. 2E shows the process 226 executing on the adjuster 220 adjusting an importance weight 228 associated with each training data set weight 218. Specifically, the process associates an importance weight 228 with data of the training data set 302 that corresponds to the associated training data set weight 218. The importance weight 228 provides indication to a training stage 304 (FIG. 3) of the machine learning model 300 to understand how much weight to provide the underlying data corresponding to the training data set weight 218 while training the machine learning model 300. In some examples, when the training data set weight 218 is greater than the cluster weight 214, the adjuster 220 associates an importance weight 228 indicating to decrease training of the machine learning model 300 with respect to training data corresponding to the respective training data set weight 218. In other examples, when the training data set weight 218 is less than the cluster weight 214, the adjuster 220 associates an importance weight 228 indicating to increase training of the machine learning model 300 with respect to training data corresponding to the respective training data set weight 218.

Figure 3:
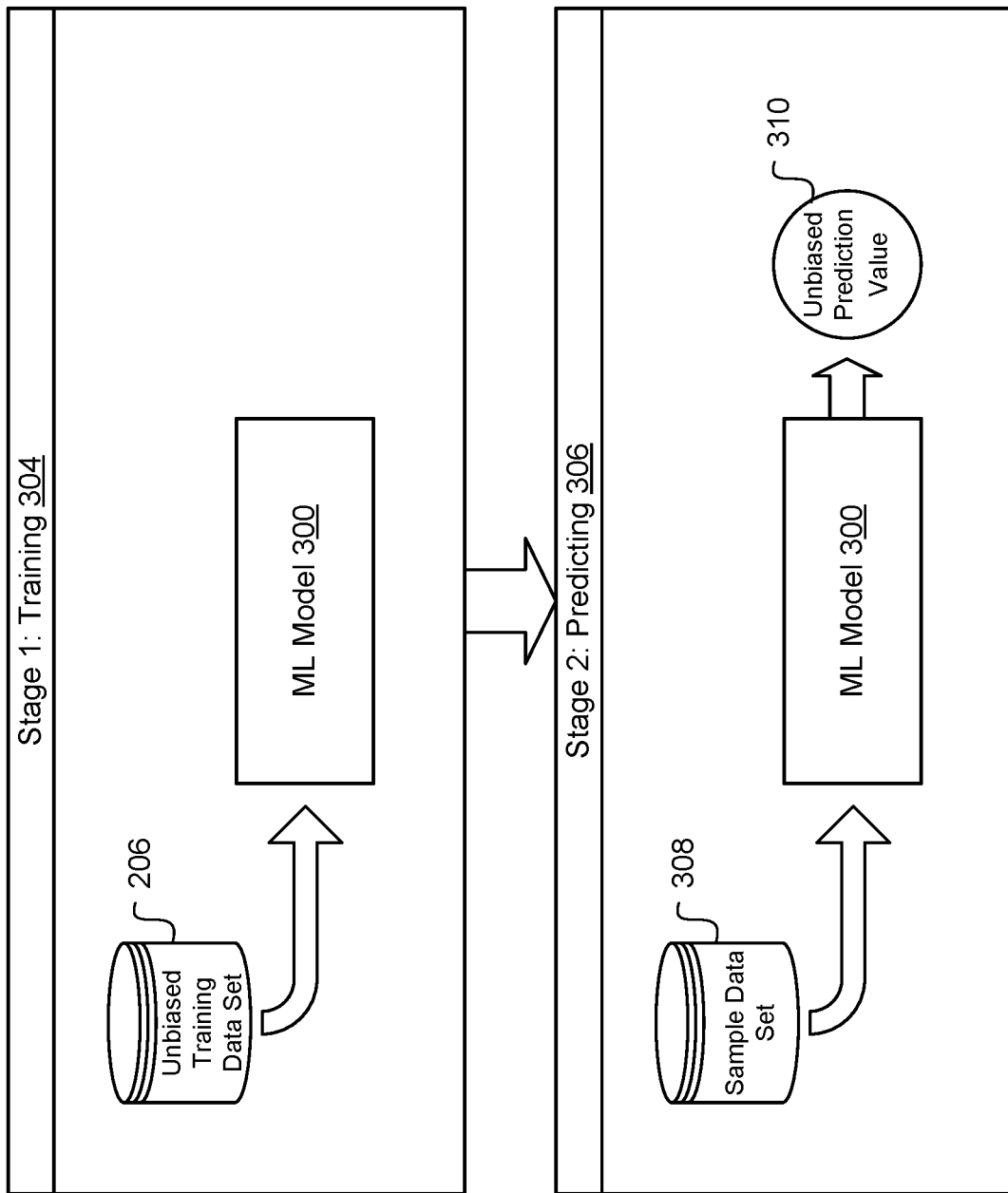
FIG. 3 is a schematic view of example processing stages for a machine learning model incorporating unbiased training data from a bias rejection model.

As shown by FIGS. 2A-2E, the bias rejection model 200 generates an unbiased training data set 206 for training the machine learning model 300. FIG. 3 is an example of the machine learning model 300 training on the unbiased training data set 206. A machine learning model, such as the machine learning model 300, is generally taught (or trained) based on data sets and result sets to predict its own output based on input data similar to the data sets. In some implementations, much like the bias rejection model 200, the machine learning model 300 first undergoes training during a training stage 304 and then undergoes a predicting stage (e.g., inference) 306 that receives a sample data set 308 as input and outputs the unbiased prediction value 310. During the predicting stage 306, the machine learning model 300 receives the sample data set 308, such as a sample data set including at least one bias sensitive variable, and utilizes the associated machine learning functionality trained on the unbiased training data set 206 to generate the unbiased prediction value 310 based on the received sample data set 308.

In some examples, the machine learning model 300 trains with more than one unbiased training data set 206. For example, the machine learning model 300 dynamically trains during operation to continuously account for dynamically changing data sets. In other words, the stages of training 304 and predicting 306 may operate consecutively or simultaneously, or some combination of both.

Figure 4:
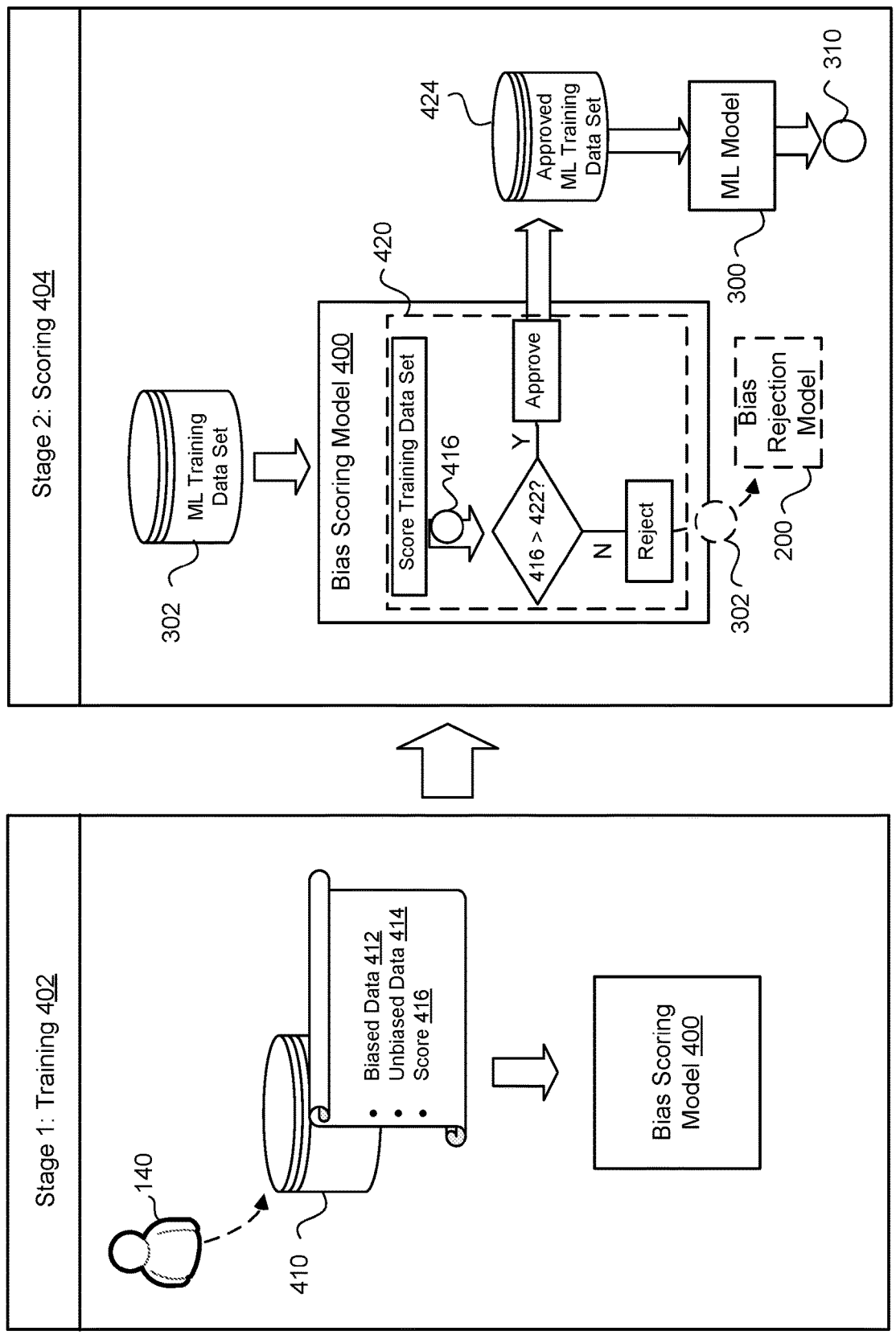
FIG. 4 is a schematic view of an example bias scoring model for generating a bias score for a data set.

FIG. 4 is an example of a bias scoring model 400. The bias scoring model 400 may be used in conjunction with or separate from the bias rejection model 200. For example, the bias scoring model 400 may assess a training data set 302 intended to train the machine learning model 300 prior to providing the training data set 302 to the bias rejection model 200 (i.e., these models 200, 300 consult with the bias scoring model 400). In these examples, when the bias scoring model 400 rejects the training data set 302, indicating that the training data set 302 is too biased to proceed to train the machine learning model 300, the bias scoring model 400 may communicate the rejected training data set 302 to the bias rejection model 200 to unbias the rejected training data set 426 and form the unbiased training data set 206, as described above with reference to 2A-2E.

Similar to the bias rejection model 200, the cluster model 211, and/or the machine learning model 300, the bias scoring model 400 undergoes a training stage 402 to train the bias scoring model 400 to score a data set and, once trained, scores data sets during a scoring stage 404 based on the training from the training stage 402. During the training stage 402, the bias scoring model 400 receives one or more bias scoring training data set(s) 410. Each bias scoring training data set 410 includes data such as biased data 412 and/or unbiased data 414 as well as a bias score 416. For instance, the bias score 416 is a numerical representation of bias within a data set. In some examples, the bias score 416 and/or the bias scoring training data set 410 originate from a scorer 140. A scorer 140 may be an administrator within the machine learning environment 10 (e.g., an administrator of the models 200, 211, 300) or a user concerned about bias at the machine learning model 300. In some examples, the scorer 140 is more than one entity/source (i.e., a committee) or another machine learning model trained to compile and/or score data sets. During the training stage 402, the bias scoring model 400 receives one or more bias scoring training data set(s) 410 and learns to generate a bias score 416 for a data set.

Once trained or in the case where a bias scoring model 400 continually trains in parallel with the scoring stage 404, the bias scoring model 400 receives (e.g., intercepts) a training data set 302 intended for the machine learning model 300. Based on its training, the bias scoring model 400 performs a scoring process 420 where the bias scoring model 400 generates a bias score 416 for the training data set 302. As part of the scoring process 420, the bias scoring model 400 determines whether the bias score 416 for the training data set 302 satisfies a score threshold 422. Here, the score threshold 422 indicates a degree of confidence that a data set is unbiased or negligibly biased for purposes of the prediction at the machine learning model 300. For example, the score threshold 422 is an acceptable bias score value.

When the bias score 416 of the training data set 302 satisfies the score threshold 422 (e.g., exceeds the acceptable bias score value), the bias scoring model 400 approves the training data 302 set as an approved training data set 424. In some examples, an approved training data set 424 includes an approval indicator recognizable by the machine learning model 300 such that the machine learning model proceeds to generate an unbiased prediction value 310 (e.g., shown in FIG. 3). When the bias score 416 of the training data set 302 fails to satisfy the score threshold 422 (e.g., is less than the acceptable bias score value), the bias scoring model 400 rejects the training data set 302. A rejected training data set 426 may include a rejection indicator to inform the machine learning model 300 not to train with the rejected training data set 302. As indicated in FIG. 4 by the dotted box and arrow, the bias scoring model 400 may communicate (i.e. provide) the rejected training data set 302 to the bias rejection model 200 such that the bias rejection model 200 may convert the rejected training data set 302 into the unbiased training data set 206, as described above with reference to 2A-2E.

The bias rejection model 200, the machine learning model 300, and/or the bias scoring model 400 may be any type of machine learning model (e.g., supervised, unsupervised, reinforcement, ensemble/decision tree, deep learning, neural network, recursive, linear, etc.) employing at least one machine learning algorithm to execute the functionality of any model 200, 300, 400 herein described. Broadly speaking machine learning algorithms may relate to supervised learning, unsupervised learning, active learning, or some hybrid combination of these types of learning algorithms. Some specific examples of these broad algorithms include machine learning algorithms such as linear regression algorithms, logistic regression algorithms, decision tree based algorithms, support vector machine algorithms, Naive Bayes classifiers, k-nearest neighbor algorithms, dimensionality reduction algorithms, gradient boosting algorithms, etc.

Figure 5:
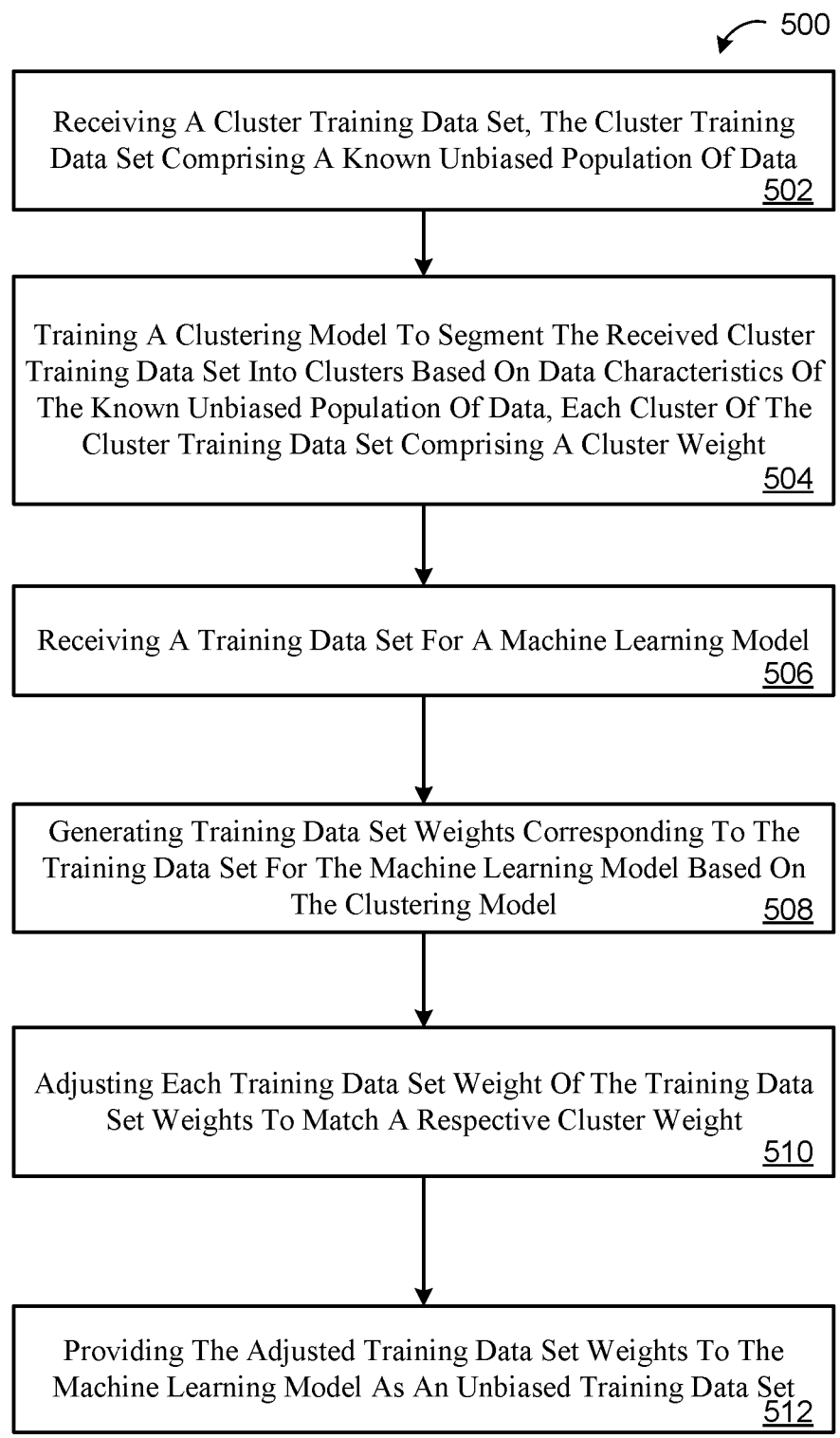
FIG. 5 is a flow diagram of an example method for unbiasing a machine learning model within a machine learning environment.

FIG. 5 is an example method 500 with operations to unbias the machine learning model 300 within the machine learning environment 10. At operation 502, the method 500 receives a cluster training data set 130. The cluster training data set 130 includes a known unbiased population of data. At operation 504, the method 500 trains a clustering model 211 to segment the received cluster training data set 130 set into clusters 212 based on data characteristics of the known unbiased population of data. Each cluster 212 of the clusters 212a-n includes a cluster weight 214. At operation 506, the method 500 receives a training data set 302 for a machine learning model 300. At operation 508, the method 500 generates training data set weights 218a-n that correspond to the training data set 302 for the machine learning model 300 based on the clustering model 211. At operation 510, the method 500 adjusts each training data set weight 218 of the training data set weights 218a-n to match a respective cluster weight 214. At operation 512, the method 500 provides the adjusted training data set 208 to the machine learning model 300 as an unbiased training data set 206.

Figure 6:
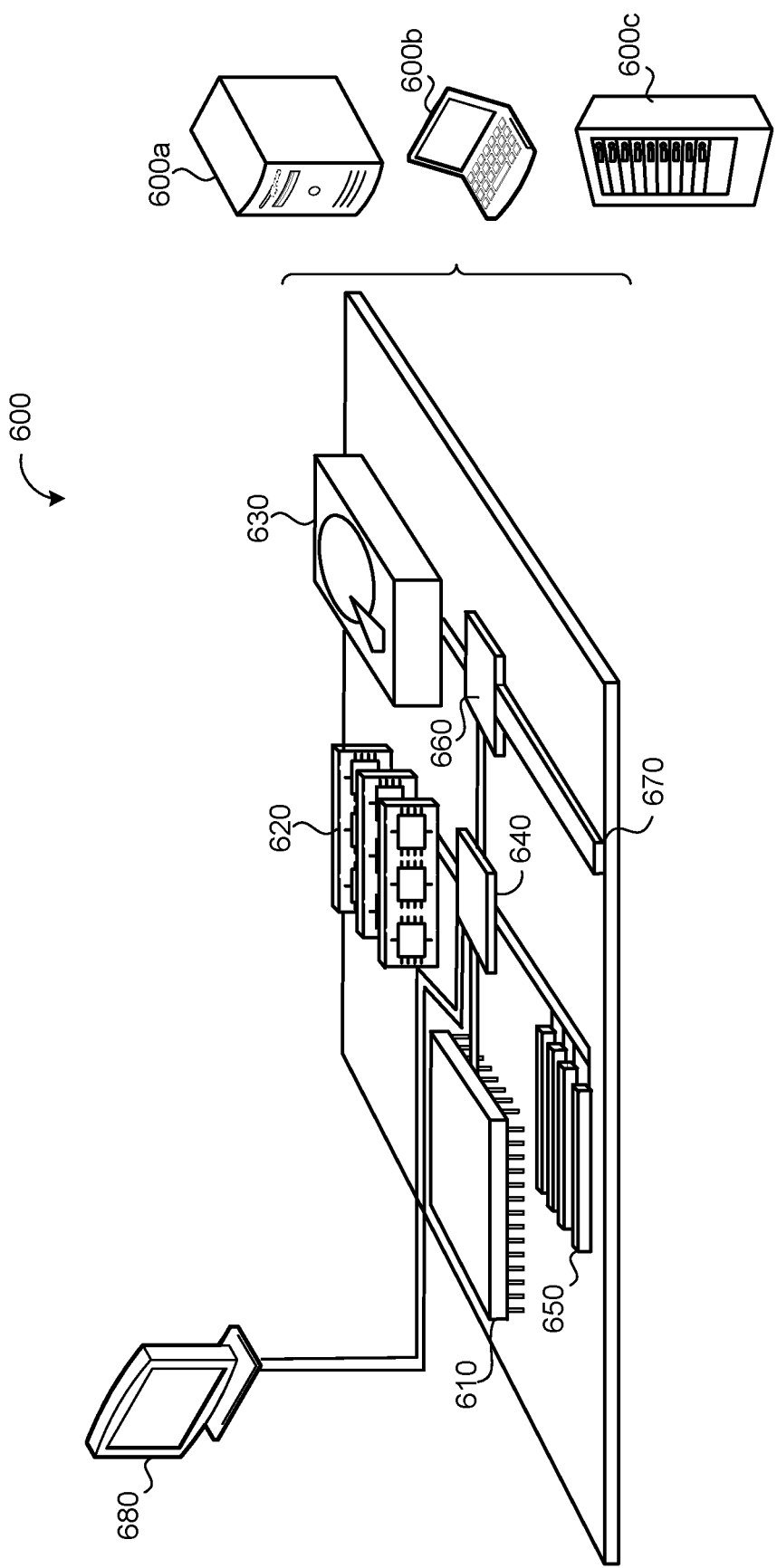
FIG. 6 is a schematic view of an example computing device that may be used to implement the systems and methods described herein.

FIG. 6 is schematic view of an example computing device 600 that may be used to implement the systems and methods (e.g., the bias rejection model 200 and/or the machine learning model 300) described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, a cluster training data set, the cluster training data set comprising a known unbiased population of data;
   training, by the data processing hardware, a clustering model to segment the received cluster training data set into clusters based on data characteristics of the known unbiased population of data, each cluster of the cluster training data set comprising a cluster weight;
   receiving, at the data processing hardware, a training data set for a machine learning model;
   generating, by the data processing hardware, training data set weights corresponding to the training data set for the machine learning model based on the clustering model;
   adjusting, by the data processing hardware, each training data set weight of the training data set weights to match a respective cluster weight and to form an adjusted training data set; and
   providing, by the data processing hardware, the adjusted training data set to the machine learning model as an unbiased training data set.

2. The method of claim 1, wherein providing the adjusted training data set to the machine learning model as the unbiased training data set comprises training the machine learning model with the unbiased training data set.

3. The method of claim 1, further comprising:
   training, by the data processing hardware, the machine learning model with the unbiased training data set;
   receiving, at the data processing hardware, a sample data set comprising at least one respective data characteristic; and
   generating, by the data processing hardware, an unbiased prediction value based on the received sample data set using the trained machine learning model.

4. The method of claim 1, wherein adjusting each training data set weight to match the respective cluster weight comprises, for each training data set weight:
   matching the training data set weight to the respective cluster weight based on a common data characteristic; and
   removing data from the training data set until the training data set weight matches the respective cluster weight.

5. The method of claim 1, wherein adjusting each training data set weight to match the respective cluster weight comprises, for each training data set weight:
   matching the training data set weight to the respective cluster weight based on a common data characteristic; and
   duplicating data from the training data set until the training data set weight matches the respective cluster weight.

6. The method of claim 1, wherein adjusting each training data set weight to match the respective cluster weight comprises, for each training data set weight:
   matching the training data set weight to the cluster weight based on a common data characteristic; and
   when the training data set weight is less than the respective cluster weight, associating an importance weight indicating to increase training of the machine learning model with respect to training data corresponding to the training data set weight.

7. The method of claim 1, wherein adjusting each training data set weight to match the respective cluster weight comprises, for each training data set weight:
   matching the training data set weight to the cluster weight based on a common data characteristic; and
   when the training data set weight is greater than the respective cluster weight, associating an importance weight indicating to decrease training of the machine learning model with respect to training data corresponding to the training data set weight.

8. The method of claim 1, wherein adjusting each training data set weight of the training data set weights to match the respective cluster weight further comprises, for each training data set weight:
   matching the training data set weight to the corresponding cluster weight based on a common data characteristic;
   when the training data set weight is less than the corresponding cluster weight, associating an importance weight indicating to increase training of the machine learning model with respect to training data corresponding to the training data set weight; and
   when the training data set weight is greater than the corresponding cluster weight, associating an importance weight indicating to decrease training of the machine learning model with respect to training data corresponding to the training data set weight.

9. The method of claim 1, wherein training the clustering model further comprises:
   segmenting the received cluster training data set into clusters based on data characteristics of the known unbiased population of data;
   for each cluster of the clusters based on the data characteristics of the known unbiased population of data, determining the cluster weight by for each cluster of the cluster model based on a ratio of a size of a respective cluster to a size of the known unbiased population of data.

10. The method of claim 1, wherein an unsupervised machine learning algorithm segments the received cluster training data set into clusters based on the data characteristics of the known unbiased population of data.

11. A system comprising:
    data processing hardware; and memory hardware in communication with the data processing hardware, the memory hardware storing instructions that when executed on the data processing hardware cause the data processing hardware to perform operations comprising:
  receiving a cluster training data set, the cluster training data set comprising a known unbiased population of data;
  training a clustering model to segment the received cluster training data set into clusters based on data characteristics of the known unbiased population of data, each cluster of the cluster training data set comprising a cluster weight;
  receiving a training data set for a machine learning model;
  generating training data set weights corresponding to the training data set for the machine learning model based on the clustering model;
  adjusting each training data set weight of the training data set weights to match a respective cluster weight and to form an adjusted training data set; and
  providing the adjusted training data set to the machine learning model as an unbiased training data set.

12. The system of claim 11, wherein the operation of providing the adjusted training data set to the machine learning model as the unbiased training data set comprises training the machine learning model with the unbiased training data set.

13. The system of claim 11, wherein the operations further comprise:
  training the machine learning model with the unbiased training data set;
  receiving a sample data set comprising at least one respective data characteristic; and
  generating an unbiased prediction value based on the received sample data set using the trained machine learning model.

14. The system of claim 11, wherein the operation of adjusting each training data set weight to match the respective cluster weight comprises, for each training data set weight:
  matching the training data set weight to the respective cluster weight based on a common data characteristic; and
  removing data from the training data set until the training data set weight matches the respective cluster weight.

15. The system of claim 11, wherein the operation of adjusting each training data set weight to match the respective cluster weight comprises, for each training data set weight:
  matching the training data set weight to the respective cluster weight based on a common data characteristic; and
  duplicating data from the training data set until the training data set weight matches the respective cluster weight.

16. The system of claim 11, wherein the operation of adjusting each training data set weight to match the respective cluster weight comprises, for each training data set weight:
  matching the training data set weight to the cluster weight based on a common data characteristic; and
  when the training data set weight is less than the respective cluster weight, associating an importance weight indicating to increase training of the machine learning model with respect to training data corresponding to the training data set weight.

17. The system of claim 11, wherein the operation of adjusting each training data set weight to match the respective cluster weight comprises, for each training data set weight:
  matching the training data set weight to the cluster weight based on a common data characteristic; and
  when the training data set weight is greater than the respective cluster weight, associating an importance weight indicating to decrease training of the machine learning model with respect to training data corresponding to the training data set weight.

18. The system of claim 11, wherein the operation of adjusting each training data set weight of the training data set weights to match the respective cluster weight further comprises, for each training data set weight:
  matching the training data set weight to the corresponding cluster weight based on a common data characteristic;
  when the training data set weight is less than the corresponding cluster weight, associating an importance weight indicating to increase training of the machine learning model with respect to training data corresponding to the training data set weight; and
  when the training data set weight is greater than the corresponding cluster weight, associating an importance weight indicating to decrease training of the machine learning model with respect to training data corresponding to the training data set weight.

19. The system of claim 11, wherein the operation of training the clustering model further comprises:
  segmenting the received cluster training data set into clusters based on data characteristics of the known unbiased population of data;
  for each cluster of the clusters based on the data characteristics of the known unbiased population of data, determining the cluster weight by for each cluster of the cluster model based on a ratio of a size of a respective cluster to a size of the known unbiased population of data.

20. The system of claim 11, wherein an unsupervised machine learning algorithm segments the received cluster training data set into clusters based on the data characteristics of the known unbiased population of data.

* * * * *